Aug. 4, 1959
N. CORDIS
2,897,954
STRAIGHT LINE TAPE-TYPE POULTRY FEEDER
Filed Dec. 7, 1953
2 Sheets-Sheet 2
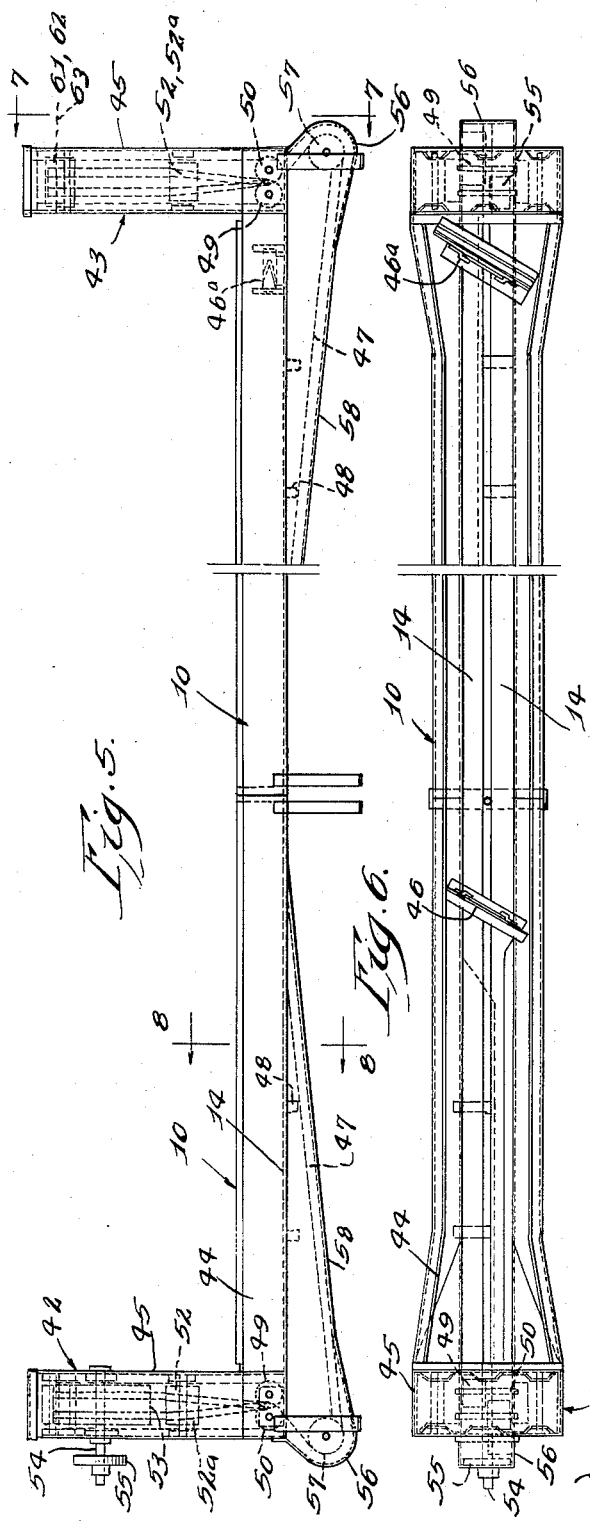
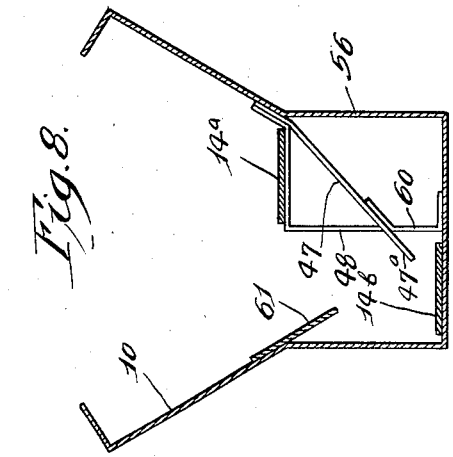
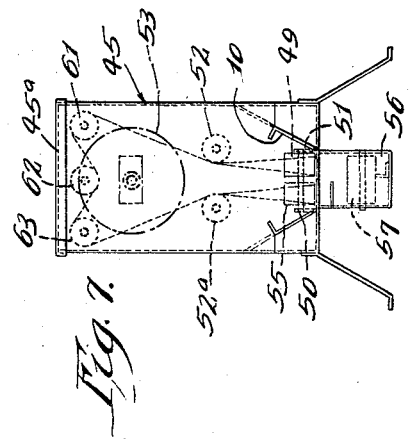
Inventor:
Nat Cordis.
By Everett O. Johnson
Attorney.

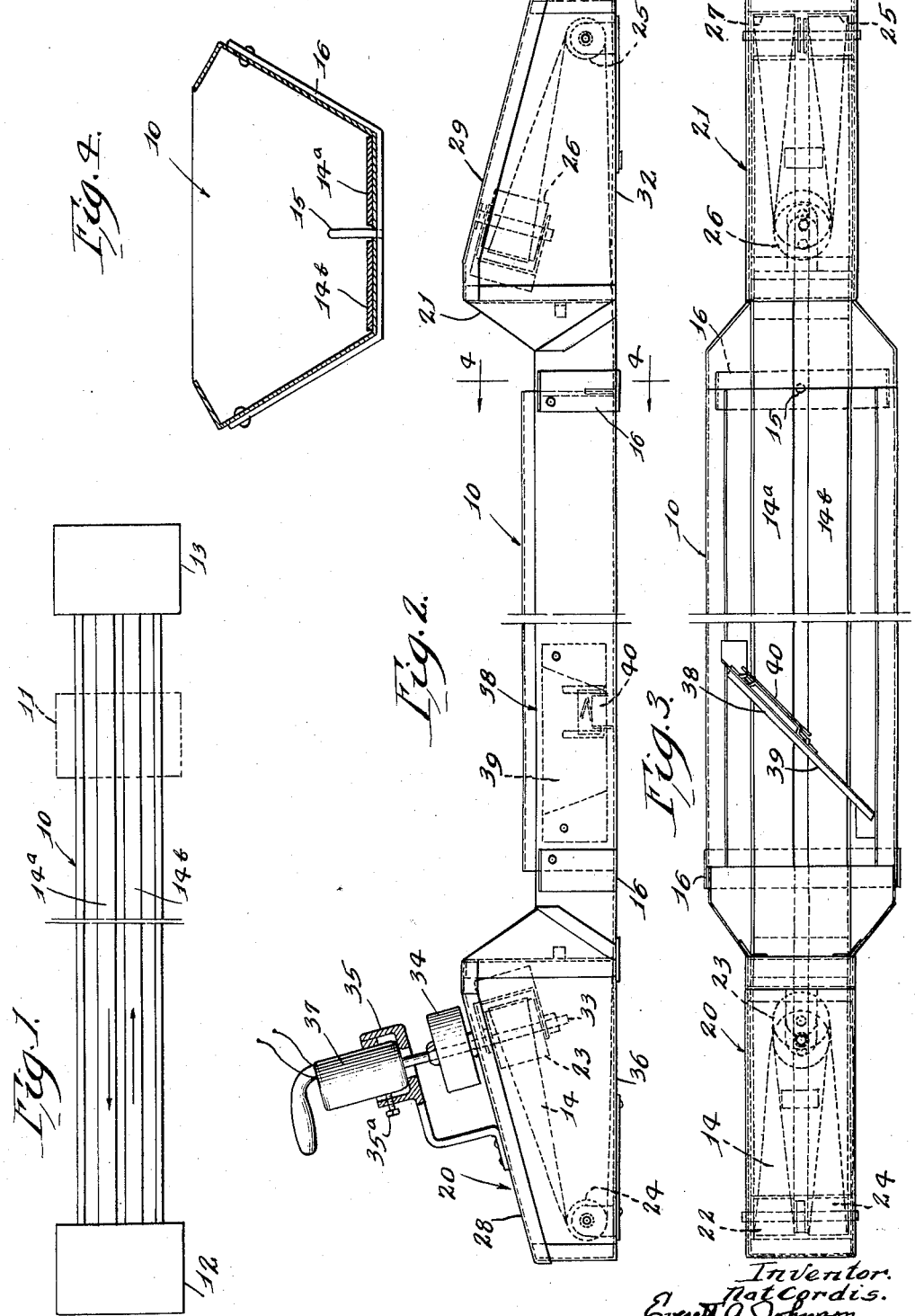

United States Patent Office 2,897,954
Patented Aug. 4, 1959

2,897,954

STRAIGHT LINE TAPE-TYPE POULTRY FEEDER

Nat Cordis, Silver Lake, Wis.

Application December 7, 1953, Serial No. 396,699

5 Claims. (Cl. 198—181)

This invention relates to conveyors for flowable solid materials and, more particularly, to a feeding device for distributing such materials along a trough accessible to stock and poultry. More specifically, the invention is an improvement in a method and means for automatically distributing feed in trough-type poultry feeders.

The problem of controlled feeding of live stock, such as poultry, on a large scale heretofore has necessarily involved much manual attention. Accordingly, a primary object of this invention is to provide a feeder of large capacity in which the supply can be maintained with a minimum of manual attention. Another object is to provide a method and automatic means for uniformly distributing such supply of fresh feed within a flock feeder. An additional object is to provide an automatic and controllable feeder which is of rugged and inexpensive construction. A further object is to provide an apparatus which maintains a fresh supply of feed in a trough and minimizes the possibility of accumulating stale feed. It is also an object of this invention to provide a conveyor mechanism which is quiet running and which does not tend to distribute the poultry. Likewise, it is a further object to provide a system which can handle various types of feeds and without tending to grind the feed within the trough.

A further important object is to provide an apparatus which is expandable for various sizes of flocks of poultry but which is efficient for use in connection with relatively small poultry flocks. These and other objects of my invention will become apparent to those skilled in the art as the description thereof proceeds.

Briefly, this invention provides an improved poultry or stock feeder of the type wherein a feed conduit comprising an open-topped horizontal trough is arranged in communication with a supply hopper and wherein an endless flexible distributing means comprising a feed-impervious, woven tape which is caused to move longitudinally within the trough. More particularly, according to this invention the feed is distributed within the trough means by an adjacent pair of generally parallel flights of such endless flexible distributing tapes with the adjacent flights moving in opposite directions. The word "flights," as used in this sense, has reference to the lengths of the distributing tape means running in opposed directions within the same portion of the trough means. The adjacent flights of the distributing means lie side by side and both ends of the trough means are closed by turn-arounds. The feed supply hopper may be placed at any convenient point since the feed will be distributed in either direction. Depending upon the type of feed used in the apparatus, the travel of the feed under the action of the parallel flights of the distributing means will be from end to end of the trough and a somewhat turbulent cross-flow resulting from the intermingling of the two streams of feed.

At the turn-arounds for the tape, it is desired to reverse the direction of travel of the endless flexible distributing means in the presence of a minimum of feed. I have, therefore, devised a system for removing feed from one flight and transferring it to the reverse flight before the endless flexible conveyor means enters the turn-around. It is also desired to drive the endless distributing means in a closed circuit and I have devised a positive drive means which is of rugged construction but having a minimum of moving parts. Further the drive end and the idler turn-around end are of interchangeable design and construction permitting the conversion of either to the other by relatively simple substitution of standard elements.

Details of my invention will be discussed by reference to particular embodiments illustrated in the drawings wherein:

Figure 1 is a schematic plan view showing the general arrangement of a stock feeder embodying the present invention;

Figure 2 is an elevation schematically showing one form of the apparatus;

Figure 3 is a plan of the feeder in Figure 2;

Figure 4 is a section taken along the line 4—4 in Figure 2;

Figure 5 is a schematic elevation of another form of the apparatus;

Figure 6 is a plan view of the complete apparatus of Figure 5;

Figure 7 is an elevation with parts removed showing the idler turn-around of Figure 6; and Figure 8 is a section taken along the line 8—8 in Figure 6.

Referring to Figure 1, a stock feeder is shown having an open-topped trough 10, a feed supply hopper 11, drive end 12, idler end 13, and an endless flexible distributing means 14 disposed within the trough 10 with the flights 14a and 14b being disposed side-by-side on the flat bottom of the trough 10. Spaced separators 15 may be provided between the flat conveyor tapes, such separators taking the form of upstanding pins which may be integral with trough connectors 16.

The preferred form of endless flexible distributor means 14 is a woven fabric tape or belting which is impervious to feed but which has a surface which will readily engage a mass of superposed feed. The lower surface of the tape 14, i.e., the side thereof which travels over the bottom of the trough 10, is provided with V-shaped ribs or plows, made of woven cord or rubber. Such ribs are arranged with the apex of the plow pointing in the direction of the travel of the tape 10 and serve to continuously wipe the feed from the trough bottom and plow it to either edge of the traveling tape.

In Figures 2, 3 and 4, the apparatus includes the trough 10, the endless distributing tape 14 with the opposed flights 14a and 14b, the drive end 20 and the idler end 21. The tape lies flat on the bottom of the trough 10, travels under guide roller 22, twists to go around drive pulley 23, again twists to pass over and under guide roller 24 and returns to the trough 10. At the idler end 21, the action is similar with the tape 14 traveling under and behind the guide roller 25, twisting to go about idler pulley 26, reversing the twist to pass around the second guide roller 27, and back along the bottom of the trough 10. The drive and idler assemblies 20 and 21 have similar frame members including upstanding side plates 30 and 31, dams 32 and 33, and sloping top plates 34 and 35. The idler guide rollers 22 and 24 are journaled on shafts extending between the side frames, and the drive pulley 23 is supported below the plate 28 with the idler pulley 26 supported below the plate 29.

The rotating surface of the first guide roller 22 in the drive end 20 is preferably spaced above the floor or bottom 36 of the end frame 20 whereas the rotating surface of the second guide roller 24 is tangent to the plane of the bottom 36 of the end frame 20. In the former case, the tape 14 is thereby caused to rise slightly above the bottom 36 as it approaches the turn-around thereby minimizing the transporting of feed below the tape 14 into it and, in the latter case, the tape 14 is caused to hug the bottom of the trough to sweep the feed from the turn-around into the trough 10. Similarly, the roller 25 may be raised above the bottom 32 of idler end 21. A hopper (not shown) is arranged intermediate the ends 28 and 29 for delivery of feed to both or either flights of the belt 14.

Tape scraper and hold-down 38 are arranged obliquely transverse to the trough 10 near both ends thereof. It comprises a plate 39 having a renewable scraper blade 40 running in contact with the upper surface of the flight 14a or 14b of the tape 14 entering the particular end.

The shaft 33 extends from the drive end 20 and a suitable drive means such as an electric motor 37 in mount 35 and coupled to transmission 34 can be used to drive the pulley 23 to effect the travel of the tape 14 in both directions through the trough 10 and through the drive turn-around 43 and the idler turn-around 44. Other drive means, such as a motor belt and a pulley on shaft 33, may be used.

Referring to Figures 5 to 7, the drive unit 42 and the idler 43 comprise a housing 45 having a pair of side walls, a front wall and a rear wall. The flanged trough 10 merges with the housing 45 by means of the trough 10 and the bulk of the feed is removed by means of obliquely transverse scraper 46. The inclined ramp 47 below the tape 14a is tipped inwardly to discharge feed therefrom into the oppositely moving tape 14b. Thus, the residual feed is scavenged from the tape 14 before it enters the drive unit 42.

The tape 14 travels over the spaced strap supports 48 and the clean tape 14 enters the unit 42 and passes under the forward first guide roller 49 journaled to shaft 50 which is supported by upstanding tabs 55. The tape 14 travels upwardly and twists from the roller 49 which is transverse to the direction of travel of the tape 14, onto the second guide roller 52 which has its axis parallel to the axis of the trough 10. The tape 14 then passes about the drive pulley 53 which is carried by drive shaft 54 between the front and rear walls of the drive unit housing 45. A pulley or gear 55 is driven by any suitable means (not shown). The driven tape 14 moves counterclockwise about the drive pulley 53 and twists to pass over third idler roller 52a and onto bottom guide roller 55. This latter roller 55 is set back from the axis 50 of the first guide roller 49 so that a flat loading reach of the web 14b is provided in the bottom of inclined pit 56. A final loading roller 57 is fixed within the loading pit 56 which comprises an inclined length of conduit 58 extending from below the housing 45, below the expander section 44, and merging with the trough 10.

On the idler end 43, a similar housing 45 is provided as shown in Figure 7. In this unit, however, the drive pulley 53 is omitted and the tape 14a, leaving the intermediate guide roller 52, is threaded over, under, and over the three top rollers 61, 62 and 63, respectively, before passing about rollers 52a, 50 and 57 as described above.

As shown in Figures 6 and 8, the ramp 47 is inclined inwardly and downwardly. It is supported from below by brackets 60 at spaced points and the ramp, in turn, supports hangers 48. The tape 14 rides over the hangers 48, spilling the feed onto the ramp 47 and thence onto the oppositely moving tape flight 14b. The ramp 47 is provided with an overhanging lip 47a to direct the transferred feed onto the lower returning flight. A companion baffle or lip 61 on the opposite side of the loading conduit 58 also serves to direct feed onto the tape emerging from the drive unit 42. In this way, the feed under the tape is immediately separated from the tape entering the drive unit in passing along and over the hangers 48. The deflecting sheet 47 then directs the feed onto the tape 14 which is beginning its return run through the trough 10.

In some cases, it may be desirable to shield the tape or webbing. This may be done by means of a fixed strip co-axial with the webbing and spaced above the parallel webs a short distance. Likewise, overhanging marginal hold-downs may be provided to keep the webbing on the bottom of the trough. These may take the form of a central rib and a pair of side beads between which the webs run.

In some instances, it will be preferred to provide a longitudinal divider in the trough between the flights of tapes 14a and 14b to minimize any possibility of the tape or webbing being lifted by the feeding poultry. Likewise, the bottom of the trough on either side of the central divider may be curved downwardly so that if lifted, the tape will tend to return to a central feed-delivering position.

Stretch-resistant webbing made of cotton duck, rayon cord, nylon, and mixtures of natural and synthetic fibers may be used. However, take-up can be provided by making one or more of the rollers adjustable with respect to another roller in the turn-around. Likewise, a telescoped portion of two trough sections may be adjustably linked to increase the length of the web path in the apparatus.

Although my apparatus has been described in terms of particular embodiments thereof which have been described in considerable detail, it should be understood that this is by way of illustration only and that the invention is not limited thereto. Alternative constructions and operating techniques will become apparent to those skilled in the art in view of my disclosure and, accordingly, it is contemplated that modifications can be made without departing from the spirit of the described invention.

What I claim is:

1. A stock feeder comprising an undivided trough means to which a feed supply is charged, an endless flat tape within said trough means, opposed flights of said tape being juxtaposed along the bottom thereof, an idler turn-around at one end of said trough means and a drive turn-around at the other end of said trough means, each said turn-around including a housing arranged in alignment with an end of the trough, a first tape guide means in alignment with a first portion of said trough bottom, a second tape guide means in alignment with a second portion of said trough bottom, and roller means comprising a system of more than two and less than six rollers all having their axis parallel to each other axis and to the direction of travel of the tape along said trough between said first and second tape guide means.

2. The apparatus of claim 1 wherein the said roller means includes a drive roller of substantially greater diameter than said first and second guide means.

3. A stock feeder comprising an undivided trough means to which a feed supply is charged, an endless flat tape within said trough means, opposed flights of said tape being juxtaposed along the bottom thereof, an idler turn-around at one end of said trough means and a drive turn-around at the other end of said trough means, each said turn-around including a housing arranged in alignment with an end of the trough, a first tape guide means in alignment with a first portion of said trough bottom, a second tape guide means in alignment with a second portion of said trough bottom, a roller means having its axis of rotation in a vertical plane parallel to the longitudinal axis of the trough in said trough means, and a tape scraper and hold-down arranged obliquely transverse to the trough and the tapes travelling therein, whereby feed is diverted from one tape to the other before the tape enters a turn-around.

4. The poultry feeding apparatus of claim 3 which includes two parallel flights of tape arranged side by side along the bottom of said trough means and simultaneously movable in opposite directions therethrough, whereby feed is carried in both directions within a single channel of the trough means and the feed is free to interchange from tape to tape within such channel.

5. The feeder of claim 3 wherein said roller means in said drive turn-around is a tape drive roller means, and power means for driving said tape drive roller means.

References Cited in the file of this patent

UNITED STATES PATENTS

| | | |
|---|---|---|
| 2,584,288 | Przybylski | Feb. 5, 1952 |
| 2,589,706 | Kitson et al. | Mar. 18, 1952 |
| 2,591,609 | Roberts et al. | Apr. 1, 1952 |
| 2,623,363 | Williams | Dec. 30, 1952 |
| 2,640,463 | Kitson | June 2, 1953 |

FOREIGN PATENTS

| | | |
|---|---|---|
| 585,526 | Great Britain | Feb. 10, 1947 |
| 641,399 | France | Apr. 16, 1928 |